(12) United States Patent
Ashe

(10) Patent No.: US 9,360,294 B2
(45) Date of Patent: Jun. 7, 2016

(54) MAGNETIC SENSORS

(71) Applicant: Ascension Technology Corporation, Milton, VT (US)

(72) Inventor: Westley S. Ashe, Hinesburg, VT (US)

(73) Assignee: Ascension Technology Corporation, Shelburne, VT (US)

( * ) Notice: Subject to any disclaimer, the term of this patent is extended or adjusted under 35 U.S.C. 154(b) by 155 days.

(21) Appl. No.: 14/068,176

(22) Filed: Oct. 31, 2013

(65) Prior Publication Data

US 2015/0115944 A1     Apr. 30, 2015

(51) Int. Cl.
*G01B 7/00* (2006.01)
*G01D 5/20* (2006.01)

(52) U.S. Cl.
CPC .............. *G01B 7/003* (2013.01); *G01D 5/2073* (2013.01)

(58) Field of Classification Search
CPC .......... G01B 7/00; G01B 7/003; G01N 27/82; G01N 29/04; G01N 9/24; G01R 33/12
USPC ........................................................ 324/232
See application file for complete search history.

(56) References Cited

U.S. PATENT DOCUMENTS

| | | | |
|---|---|---|---|
| 4,017,858 A | 4/1977 | Kuipers | |
| 6,211,673 B1* | 4/2001 | Gerber | G01Q 60/56 324/260 |
| 6,282,104 B1* | 8/2001 | Kern | H02M 1/12 363/34 |
| 2009/0323468 A1* | 12/2009 | Teigen | G01V 1/201 367/20 |
| 2011/0312021 A1* | 12/2011 | Carr | C12M 41/36 435/34 |
| 2012/0163696 A1* | 6/2012 | Ross | G01R 33/04 382/135 |
| 2012/0200292 A1* | 8/2012 | Sugihara | B82Y 25/00 324/252 |
| 2014/0333295 A1* | 11/2014 | Fernandez | G01R 33/0023 324/207.12 |

* cited by examiner

*Primary Examiner* — Tung X Nguyen
*Assistant Examiner* — Zannatul Ferdous
(74) *Attorney, Agent, or Firm* — Fish & Richardson P.C.

(57) ABSTRACT

Among other things, the disclosure features a system comprising a sensor, a DC magnetic field source, an AC magnetic field source, and a receiver. The sensor has an aspect ratio of 10:1 or higher and comprises a ferromagnetic material. The ferromagnetic material has a non-linear magnetization response, and the response contains a maximum point of non-linearity. The DC magnetic field source is adjustable for providing a magnetic excitation field to excite a magnetic field within the sensor. The provided magnetic excitation field has a range such that the excited magnetic field within the sensor is near the maximum point of non-linearity. The AC magnetic field source is configured to generate an AC magnetic field to cause the sensor to generate even harmonics. The receiver is configured to receive the even harmonics from the sensor for determining a position of the sensor.

34 Claims, 5 Drawing Sheets

MAGNETIC SENSORS

TECHNICAL FIELD

This disclosure relates to magnetic sensors, such as elongated sensors that are used for tracking objects.

BACKGROUND

Magnetic sensors can be used in tracking objects. Typically, the sensors are attached to or part of the objects. Upon excitation, response signals from the sensors can be collected for determining the locations of the objects.

SUMMARY

In one aspect, the disclosure features a system comprising a sensor, a DC magnetic field source, an AC magnetic field source, and a receiver. The sensor has an aspect ratio of 10:1 or higher and comprises a ferromagnetic material. The ferromagnetic material has a non-linear magnetization response, and the response contains a maximum point of non-linearity. The DC magnetic field source is adjustable for providing a magnetic excitation field to excite a magnetic field within the sensor. The provided magnetic excitation field has a range such that the excited magnetic field within the sensor is near the maximum point of non-linearity. The AC magnetic field source is configured to generate an AC magnetic field to cause the sensor to generate even harmonics. The receiver is configured to receive the even harmonics from the sensor for determining a position of the sensor.

In another aspect, the disclosure features a method comprising applying a DC magnetic field to a sensor comprising a ferromagnetic material to excite a magnetic field within the sensor. The sensor has an aspect ratio of 10:1 or higher. The ferromagnetic material has a non-linear magnetization response to a magnetization excitation. The response contains a maximum point of non-linearity. The method also includes adjusting the DC magnetic field so that the excited magnetic field within the sensor is near the maximum point of non-linearity, applying an AC magnetic field to cause the sensor to generate even harmonics, and analyzing the even harmonics to determine a position of the sensor.

In another aspect, the disclosure features a system comprising an elongated sensor, a plurality of DC magnetic field sources, an AC magnetic transmitter, and a plurality of receivers. The elongated sensor comprises a ferromagnetic material having a non-linear magnetization response that contains a maximum point of non-linearity. The plurality of DC magnetic field sources are configured to adjust a magnetic field within the sensor near the maximum point of non-linearity. The AC magnetic transmitter is operable to generate an AC magnetic field in the vicinity of the sensor and to cause the sensor to generate even harmonics in response to the AC magnetic field. The plurality of receivers are capable of detecting at least some of the even harmonics from the sensor. The detected even harmonics are usable for determining a position of the sensor. There can be a computer for determining the position of the sensor.

In another aspect, the disclosure features a system comprising a composite sensor. The composite sensor comprises a first elongated sensor comprising a first ferromagnetic material. The first ferromagnetic material has a first non-linear magnetization response that contains a first maximum point of non-linearity, a second non-linear magnetization response that contains a second maximum point of non-linearity, and a substantially linear magnetization response between the first and second maximum points of non-linearity. The system also comprises a first coil wound about a long axis of the first elongated sensor, a second coil electrically connected to the first coil, a plurality of DC magnetic field sources, a plurality of AC magnetic transmitters, and a plurality of receivers. The plurality of DC magnetic field sources are configured to adjust a magnetic field within the first sensor near the first maximum point of non-linearity and the second maximum point of non-linearity. The plurality of AC magnetic transmitters are operable for causing the first and second coils to generate even harmonics in response to the AC magnetic fields. The plurality of receivers are capable of detecting at least some of the even harmonics from the first and second sensors. The detected even harmonics are usable for determining a position of the first sensor in five degrees of freedom and a position of the composite sensor in five degrees of freedom. The first and second coils can be electrically connected in parallel.

Certain implementations of the methods and/or the systems may include one or more of the following features. The sensor comprises an elongated rod formed of the ferromagnetic material. The sensor comprises a foil. The sensor comprises a tube. The tube comprises all or part of a hypodermic needle. The sensor is incorporated in a needle of a syringe and the DC magnetic field source is incorporated in a body of the syringe. The DC magnetic field source comprises a single bias coil. The bias coil has a long axis substantially aligned with a long axis of the sensor. A distance between the sensor and the DC magnetic field source remains substantially the same during use of the syringe, and the distance is in an order of centimeters. A processor is used for determining the position of the sensor based on the even harmonics. The DC magnetic field source is configured to maximize the even harmonics from the sensor. The DC magnetic field source and the AC magnetic field source are co-located. The DC magnetic field source and the AC magnetic field source comprise a common transmitter coil. The DC magnetic field source and AC magnetic field source are separated. Multiple DC magnetic field sources are included. Multiple receivers are configured to receive the even harmonics. The DC magnetic field source is configured to be adjustable to maximize the even harmonics from the sensor. The multiple receivers are arranged at different locations relative to the sensor and receive the even harmonics having different amplitudes, and the even harmonics having different amplitudes being used for determining the location of the sensor. The received even harmonics are to be processed for determining an orientation of the sensor. The received even harmonics are to be processed for determining the position and the orientation of the sensor in at least five degrees of freedom. The received even harmonics are to be processed for determining the position and the orientation of the sensor in six degrees of freedom. The DC magnetic field source is arranged such that the DC magnetic field is aligned with a long axis of the sensor.

Certain implementations of the methods and/or the systems may include one or more of the following features. Adjusting the DC magnetic field comprises aligning the DC magnetic field with a long axis of the sensor. The response contains a minimum point of non-linearity and method comprises adjusting the DC magnetic field so that the excited magnetic field within the sensor is near the minimum point of non-linearity. A distance between the maximum point and the minimum point of non-linearity is determined. Analyzing the even harmonics comprises calculating an amplitude of the even harmonics. The even harmonics are received using multiple receivers at different locations relative to the sensor, and the amplitudes of the even harmonics received by different receivers are different. Adjusting the DC magnetic field comprises maximizing the even harmonics from the sensor and minimizing a total DC excitation while maintaining the maximized even harmonics. AC signals are received from the sensor using multiple receivers and analyzing the even harmonics to determine a position of the sensor comprises determining a position of an AC magnetic center of the receivers. A computer is used for determining the position of the sensor. The first and second coils are electrically connected in parallel.

Two or more of the features described in this disclosure may be combined to form implementations or examples not specifically described herein.

Control of the various systems described herein, or portions thereof, may be implemented via a computer program product that includes instructions that are stored on one or more non-transitory machine-readable storage media, and that are executable on one or more processing devices. The systems described herein, or portions thereof, may be implemented as an apparatus, method, or electronic system that may include one or more processing devices and memory to store executable instructions to implement control of the stated functions.

The details of one or more implementations are set forth in the accompanying drawings and the description below. Other features, objects, and advantages will be apparent from the description and drawings, and from the claims.

DETAILED DESCRIPTION

Overview

Figure 1:
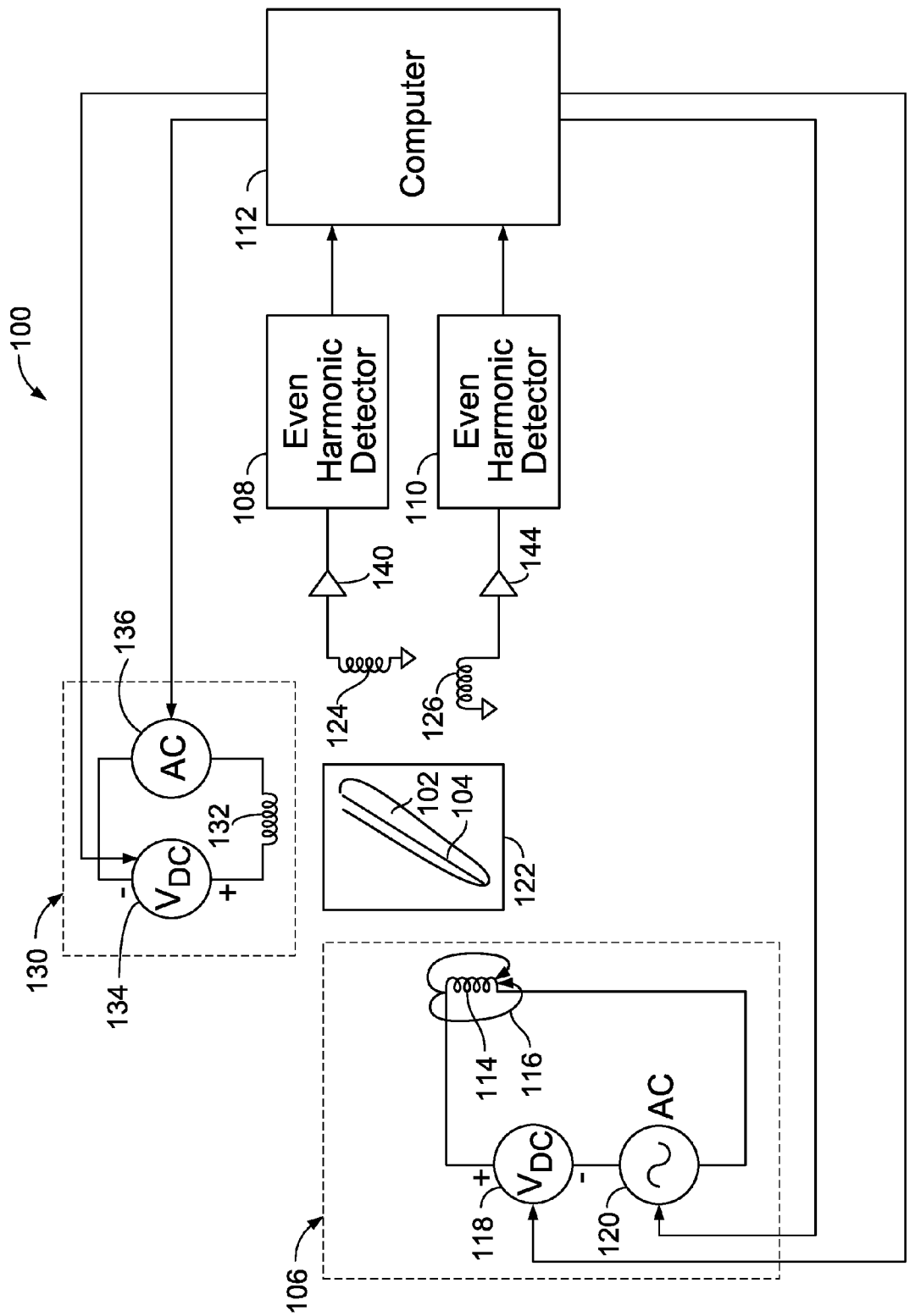
FIG. 1 is a block diagram showing an example of a tracking system.

A passive wireless sensor having an elongated ferromagnetic core can be used, together with one or more magnetic fields, to measure a position and an orientation of an object. The sensor can be attached to the object of which the position and orientation are to be measured. In some embodiments, the sensor can be placed inside or embedded in the object. The sensor can have a small size, e.g., a diameter of about 0.1 to 1 mm and a length of about 5 to 50 mm, so that the sensor can be placed with small objects or objects having similar shapes, such as medical needles, without interfering the functions of the objects. Other sizes can also be used based on needs. The elongated ferromagnetic core can have an aspect ratio of 10:1 or more, based on one or more physical dimensions of the core or other representations or measures of the physical dimensions. In addition, the sensor is passive and does not have any external electrical connections. The sensor can have various shapes, such as shapes that are chosen based on the objects to be tracked. Sometimes the sensor is in the shape of a wire, and at other times it may be tubular, such as a hypodermic needle. The position and the orientation of the object can be determined in at least five degrees of freedom, or even in six degrees of freedom. In some implementations, the position and the orientation of the sensor can be tracked within a volume (which we call a tracking volume) that is 20 $cm^3$ or larger. The tracking volume can be determined by the arrangement of the elements (discussed below) in the tracking system and the sensor. Sometimes when the sensor is outside the tracking volume, the system may needs to be adjusted to continue to track the sensor.

The magnetization curve (which is also called the BH curve or the hysteresis curve) of certain ferromagnetic materials can be made to exhibit a sharply defined transition between unsaturated and saturated states. Such a transition is sometimes called a "knee." A knee can also be viewed as maximum or minimum point of non-linearity on the BH curve. For example, particular materials, steps of processing the materials, etc. can be chosen to produce a desired magnetization curve. To measure the position and the orientation of the object, the object is placed in one or more excitation magnetic fields such that the magnetic field (or the B field) in the ferromagnetic core of the sensor has a value that corresponds to selected points on the BH curve. In some embodiments, a direct current (DC) bias B field is applied such that the B field in the ferromagnetic core is located at a corner of the knee. An alternating current (AC) B field component is then applied to cause the ferromagnetic core to transition on either side of the knee between the saturated and linear (unsaturated) states in response to alternating polarities of the AC field. As a result of such transitions, the core radiates a magnetic field that contains even harmonics of the applied AC field. These even harmonics are detected by a receiving antenna and used in one of the following manners to determine the position and orientation of the ferromagnetic core.

The DC magnetic field and the AC magnetic field can both be generated by one or more coils. In some implementations, the DC magnetic field is generated by applying a DC current to a constellation of coils. The orientation of the coils can be pre-arranged or can be adjusted to adjust the DC magnetic field. The magnitudes of the DC current applied to each coil can be the same or can be different, and can be adjusted for adjusting the DC magnetic field. In some situations, the DC bias field can be a nutating bias field, e.g., as described in U.S. Pat. No. 4,017,858, the entire content of which is incorporated herein by reference. Collectively, the combination of the magnetic fields generated by different coils forms the DC magnetic field having a magnetic vector (with a direction and a magnitude). The magnetic vector can be adjusted by adjusting one or more of the coils.

The sensor can be formed of one or more materials with a BH curve having sharp knees to facilitate the process of locating the knees using the DC field and exciting the sensor to produce even harmonics. The sensor can be a bare length of a material, e.g., a metal, without any coil wires wound on its length. As a result, the sensor can be relatively small, e.g., less than about 5 mm in length and/or less than about 0.15 mm in diameter, and can be made inexpensively. The small sensor can be suitable for use in tracking objects that have small sizes, e.g., medical needles.

In some implementations, not all even harmonics are utilized. Satisfactory tracking or measurement can be obtained by using only a subgroup of the even harmonics, such as the second harmonic.

Three example methods of tracking or determining the position and the orientation of the sensor are provided below, which can be used separately or in combination.

In a first example method, the AC field is chosen and applied without adjustment, while the DC bias B field is adjusted to locate the two knees on the BH curve of the ferromagnetic core. In some implementations, the DC bias B field is adjusted by adjusting the current that is applied to a DC bias field coil(s) for generating the DC field so that the magnitude of the detected even harmonics radiated from the core of the sensor are maximized. Then the polarity of the DC bias field is reversed and the current is adjusted to maximize detected even harmonics again. This process finds locations on the BH curve at which the slope of the BH curve changes the most, effectively locating the two knees of the BH curve. The current differential between the two bias field polarities can be stored. Sometimes the stored differential is used in DC bias adjustment processes that are repeated for multiple DC bias sources. In the unadjusted AC field (or constant AC field), the located BH curve for the sensor does not change (or is constant). In addition, the DC current and its relationship with the field characteristics of the DC magnetic bias field are known. Based on data collected from the even harmonics and the known information about the DC current, the position and the orientation of the sensor can be determined, the details of which are discussed further below.

A second example method starts similarly to the first example method by applying a constant AC magnetic field and adjusting DC current for the DC bias field coils to maximize the detected even harmonics from the core. After the detected even harmonics are maximized, both the DC bias field and the AC magnetic field are held constant. Then multiple harmonic detectors are utilized to detect the amplitudes of the even harmonics from the sensor. Based on the constant DC bias field, the constant AC field, the constant BH curve of the sensor, and the constant even harmonic signals from the core, the position and the orientation of the sensor can be determined, the details of which are discussed further below.

A third example method can be used to determine the position and the orientation of a sensor in six degrees of freedom. In this method, a first sensor coil of wire is wound around a first ferromagnetic senor core which possesses a sharply defined BH curve transitions (or knees). The two lead wires from the first coil are then connected to a second sensor coil of wire, whose axis is located at a non-zero angle to an axis of the first sensor coil. The second sensor coil is selected to have a substantially linear BH curve. The first and second sensor coils form an effective composite sensor. Like the first and second methods, a DC bias field and an AC field are provided and the DC bias field is adjusted to maximize the detected second harmonic, a sub-group of the even harmonics, from the composite sensor. The first and second sensor coils are arranged such that their long axes form a non-zero angle relative to each other. The position and the orientation of each sensor coil can be determined, independently in 5 degrees of freedom, using a method similar to the first example method. Based on the positions and the orientations of the sensor coils, the position of the composite sensor can be determined. Furthermore, a method similar to the second example method can be used to locate a net maximum response axis of the composite sensor in the 5 degrees of freedom. When the first sensor coil having a non-linear core is not located along the magnetic axis of the composite sensor, the position and orientation of the composite sensor can be determined in 6 degrees.

In some implementations, a resonating capacitor is placed in series or in parallel with the first and second sensor coils to form a tuned circuit. The circuit can be used to increase the signal magnitude from the sensor elements (such as the sensor, the sensor coils, etc.) of the above example methods. The resonant frequency of the resulting combination is then tuned to maximize the second harmonic emission from the sensor, thus increasing the tracking range.

Example Implementations

Referring to FIG. 1, a system 100 for tracking the position and the orientation of an object 102 through a sensor 104 includes a field generator 106 that applies one or more magnetic fields to the sensor 104 and one or more detectors 108, 110 in communication with a processor, such as a computer 112. In the example shown in FIG. 1, the field generator 106 includes a magnetic excitation field coil 114 for producing a DC field 116 in response to a DC excitation 118 (e.g., a DC current). An AC field can be generated in response to an AC excitation 120 (e.g., an AC current). The response of the sensor 104 to the applied one or more magnetic fields, i.e., the even harmonics, is detected or received by the one or more detectors 108, 110 and processed by the computer 112. In some implementations, the computer 112 includes a display (not shown) that displays the detected signals, the processing steps, and/or the processing results (e.g., the detected position and orientation of the sensor 104) in a user interface to a user. The user may be enabled to interact with the user interface to make adjustment to the different elements in the system 100. In some implementations, the computer 112 is connected to a network, e.g., the Internet, and the information or data for the detected signals, the processing steps, and/or the processing results can be delivered through the network to another machine or user interface that is not local to the computer 112.

The sensor 104 can be in the form of a ferromagnetic wire. Suitable materials for the sensor can include a so-called "Square Loop" material, such as 77% Ni 6% Mo 17% Fe, commercially available as HyMu 80® from Carpenter Technologies Corporation, Wyomissing, Pa., USA. As an example, the sensor 104 can be made by drawing a sensor material into a wire and annealing the wire in an axial magnetic field. The formed sensor can have a square-like BH curve 300 shown in FIG. 3. The BH curve 300 includes a linear region 302, saturated regions 304, 306, a positive knee 308, and a negative knee 310. Both knees 308, 310 are close to being square.

The dimensions of the sensor 104 are chosen based on the need for tracking an object, e.g., the size and/or shape of the object, the precision of the tracking, etc. As an example, the dimensions of the sensor 104 can be selected such that the DC field 116 having a predetermined range can move the internal B field of sensor 104 between the positive knee 308 and the negative knee 310. The process of adjusting the DC bias field and producing the desired internal B field can be affected by one or more of the physical size and power consumption of the field generator 106, a desired size of an operating volume 122, the diameter and length of the sensor 104, and other parameters. In some situations, two or more of the parameters are correlated and may collectively affect the adjustment. As examples, the sensor 104 has a diameter of about 10-20 mm, e.g., about 15 mm, and a length of about 10-50 mm, e.g., about 16 mm. Other sizes may also be used.

The generator 106, the sensor 104, the detector(s) 108, 110, and the computer 122 can be placed relatively close to each other, e.g., in the same medical room. Sometimes the generator 106, the sensor 104, and the detector(s) 108, 110 are placed relative to each other at distances within a meter, e.g., in the order of centimeters. In some implementations, the computer 122 may be in a different room or may be connected to the detector(s) 108, 110 or other elements of the system 100 from a remote location and through a network.

First Example Implementation

The AC field and the DC field are controlled to produce a desired B field in the sensor 104, the value of which is sometimes called an operating point on the BH curve of the sensor 104. In an example of operation, the field generator 106 produces an AC field and a DC field 116 simultaneously. The AC field can have a frequency of 12 KHz and is superimposed on the DC field 116. Initially, a positive DC field is applied and adjusted until a receiver 124 or 126 receives even harmonics of the AC excitation 120. The signals received by the receiver 124 or 126 can be amplified by amplifier 140 or 144 and delivered to the detector 108. The information related to the detected even harmonics is delivered to the computer 112 from the detector 108 or 110. In some implementations, the receiver 124 or 126 is a coil of wires and is sensitive to magnetic fields. The detectors 108, 110 can be an FFT (fast Fourier transform) processor that separates the desired signals (e.g. the even harmonics) from all other signals received by the respective receivers 124, 126. Each detector 108, 110 also processes the received even harmonics, e.g., computing the amplitude by implementing the FFT or other suitable means, such as a synchronous demodulator. The magnitude of the desired signal components is then sent to the computer 112.

Figure 6:
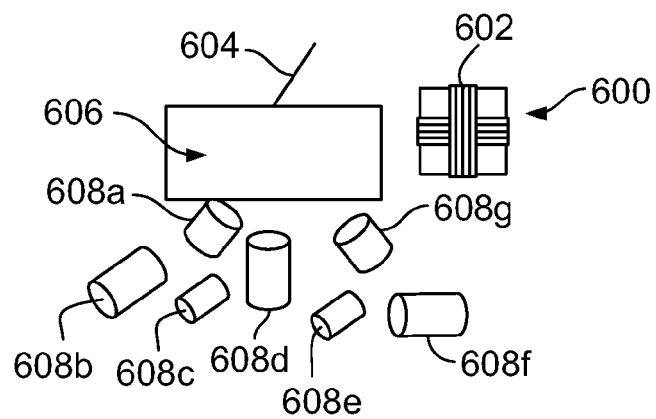
FIG. 6 is a block diagram showing a part of an example tracking system.

The detector and the receiver can be arranged in various ways relative to the sensor and relative to each other. Sometimes the arrangements are chosen based on simulations or experimentation or on a case-by-base basis. In some implementations, the elements are placed along a circular ring with a radius equal to the furthest point at which sensor 104 is to be tracked, and the locations of the elements can be adjusted during the tracking The receiver 124 or 126 can be located around the operating volume 122, an example of which is shown in FIG. 6.

Then the DC excitation 118 is adjusted, e.g., by an operator or a user who has direct access to the DC excitation 118 or through a network or a machine, until signals of the even harmonics received by the receiver 124 or 126 is maximized. Typically, the adjustment includes increasing or decreasing the DC current to one or more coils for producing a desirable DC magnetic vector. When the maximization is achieved, the internal B field of the sensor 104, depicted by the BH curve 300, is such that the component generated by the DC bias field is approximately or exactly at the positive knee 308. In the positive half cycle of the AC excitation, the internal B field of the sensor 104 enters the saturated region 304, and in the negative half cycle of the AC excitation, the internal B field of the sensor 104 enters the linear region 302. In the example shown in FIG. 3, the knee 308 of the sensor 104 is nearly square, and generally, a permeability of such a sensor is approximately 1 in the saturated region 304, and is approximately 10,000 in the linear region 302.

Figure 4:
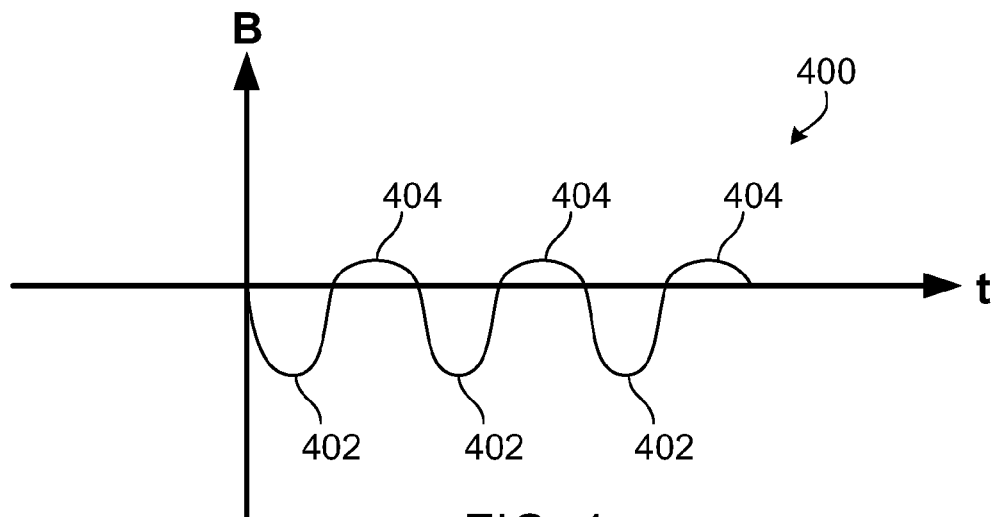
FIG. 4 is a schematic plot of a radiated magnetic field generated by a sensor.

In response to the DC and AC excitations, the sensor 104 produces an asymmetric sensor radiated B field, an example 400 of which is shown in FIG. 4. Generally, a ferromagnetic rod having a relatively high length to diameter ratio, e.g., 10:1 or greater, the ferromagnetic rod can have a relatively high magnetization gain of 10 or greater when the B field of the rod is in the linear region of the BH curve. When the B field of the rod is in the saturation regions of the BH curve, the magnetization gain of the rod is nearly unity.

During the negative half cycle of the AC excitation and when the internal B field of the sensor 104 is in the linear region 302 of the BH curve, the sensor 104 in the form of a ferromagnetic rod generates a linear region radiated field 402 based on its high magnetization gain. During the positive half cycle of the AC excitation and when the internal B field of the sensor 104 is in the saturated regions 304, the sensor 104 generates a saturated region radiated field 404 at a lower amplitude compared to the amplitude of the field 402, as the saturation reduces the magnetization gain. As a result of the above mechanisms, the sensor 104 produces an asymmetrical radiated magnetic field containing even harmonics.

In some implementations, the generator 106 is selected and controlled to produce a low distortion sine wave in addition to the DC field, such that the fundamental is 80 to 100 dBv above the even harmonic level. Generally, the fundamental refers to the major, lowest undistorted frequency component of an AC source, and the even harmonics are all even multiples of the fundamental, excluding zero. As a result, the even harmonics received by the receiver 124 or 126 originates primarily from the sensor 104. As an example, the even harmonics level at the sensor 104 is about 50 dBv to about 70 dBv below the fundamental, and the ratio of the even harmonics generated by the sensor 104 to the parasitic second harmonic about 10 to 50. The parasitic second harmonic may occur when the generator 106 does not produce a perfect, harmonic free fundamental, e.g., caused by distortion.

The detected harmonics from the sensor 104 can be used to adjust the DC excitation to place the operating point of the sensor 104 to the proximity of the knee 308, e.g., being exactly at the knee 308. When the DC component of the excitation causes the operating point of the sensor 104 on the BH curve to deviate from the knees by entering either the saturated regions 304 or the linear region 302, the deviation may cause the asymmetry in the field radiated by the sensor 104 to be reduced, leading to a reduced second harmonic content in the radiated field. In some implementations, a user may monitor the detected second harmonics through the computer 122 and adjust the amplitude of DC excitation 118 to maximize the second harmonics. In some implementations, one or more of the monitoring and the adjustment is done automatically by a machine.

The polarity of the DC excitation 118 is then reversed, and through a similar process, the operating point of the sensor 104 is located at the negative knee 310 of the BH field 300. For a given sensor, a distance 312 between the positive knee 308 and the negative knee 310 has a fixed value. In some implementations, multiple generators 106, 130 can be used and controlled such that each generator produces the same field differential (or the distance 312 on the BH curve 300) at the sensor 104. The generator 130 can be the same as the generator 106. For example, the generator includes a magnetic excitation field coil 132 that generates magnetic fields in response to an AC excitation 136 and a DC excitation 134.

Generally, the magnetization field of a long ferromagnetic rod generated in response to excitation is substantially confined along the long axis of the rod when the rod has a ratio of its length to its diameter 10 or greater. As an example, the sensor 104 has a length to diameter ratio of about 10:1 to about 500:1, e.g., about 106.67:1. The magnetization gain of the sensor 104 can be greater than 2,000, which generally means that the sensor 104 is 2,000 times easier to saturate using an excitation field that aligns with the long axis of the rod as compared to using an excitation field that forms non-zero angles with the long axis. In response to excitations, the sensor 104 radiates substantially all fields along the direction of its long axis.

Referring also to FIG. 6, in some implementations, one or more generators 106, 130 of FIG. 1 is energized (or powered to produce a magnetic field in response to current) by a transmitter 600. The direction of the fields from the generator(s) 106, 130 aligns with the long axis of sensor 604, which is the same as or similar to the sensor 104, during the determination of the distance 312 on the BH curve 300. As an example, the transmitter 600 can be a dipole transmitter including three generators, each of which being the same as or similar to the generator 106. The coil 602, e.g., similar to or the same as the coil 114, of each generator can be arranged as three co-wound orthogonal coils. The transmitter 600 can produce DC and AC magnetic field vectors having any desired direction and any magnitude within the practical limits of transmitter 600. Some examples of the practical limits include heat due to power dissipation in the coils or, if the coil 1 is wound on a ferromagnetic core, magnetic saturation of the core.

Each coil 602 in the transmitter 600 is located in a selected spatial position and orientation to produce a desired magnitude and orientation of the DC field and the AC field within an operating volume 606. Methods such as finite element analysis or mathematical modeling can be used to facilitate the selection. In some implementations, multiple coils 600 are selected to be co-located to produce a common magnetic center while emitting magnetic fields having non-parallel angles. Multiple receivers 608a-608g, each similar to or the same as the receiver 124, are placed about the operating volume 606 to collect data from the sensor 604.

Figure 2:
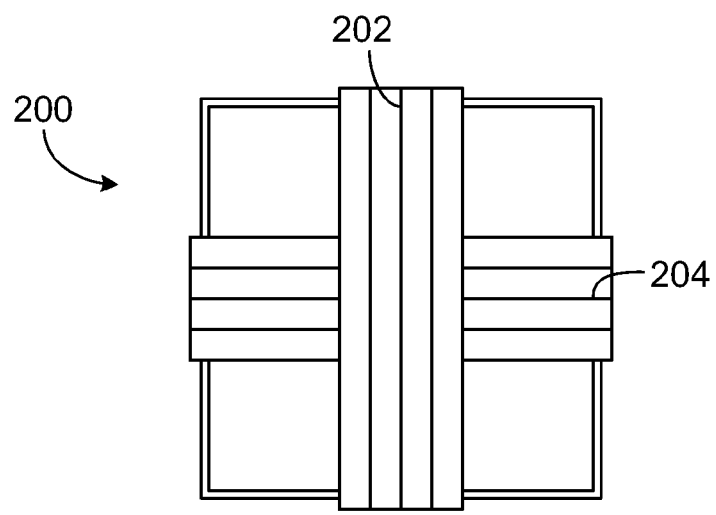
FIG. 2 is a schematic view of a transmitter.
Figure 5:
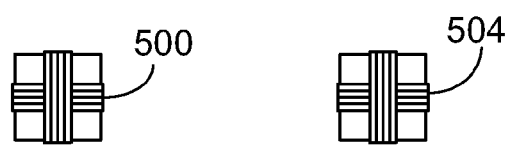
FIG. 5 is an example arrangement if four transmitters.
Figure 5:

An example of a set 200 of spatially co-located coils 202, 204 is shown in FIG. 2. In some implementations, three nested orthogonal coils wound at right angles to each other can be included in the set 200. Each nested coil can be part of a different generator, e.g., the generator 106. A system like the system 100 can include multiple transmitters, such the transmitter 600 of FIG. 6. As an example, FIG. 5 shows four transmitters 500, 502, 504, 506 in a square arrangement. In some implementations, among the multiple transmitters, only one of the transmitters includes an AC source, such as the AC excitation 120 of FIG. 1. The system generates a single AC magnetic vector having an X, Y, Z component and a magnitude. Each of the multiple transmitters includes a DC source, such as the DC excitation 118. When a system includes the four transmitters shown in FIG. 5, four DC magnetic vectors having an X, Y, Z magnitude are generated, the combination of which is used to excite the sensor.

The alignment of the excitation fields and the long axis of the sensor 104 can be achieved by adjusting the DC excitation 118 of the multiple generators 106, 130 such that the total current from all generators 104, 130 is at a minimum at the moment when the even harmonic level at the receiver 124 or 126 is at a maximum. Such a minimum current corresponds to a minimum total external B field to produce a desired internal B field of the sensor 104, i.e., the internal B field being approximate to or at the positive knee 308 or the negative knee 310. The distance 312 between the positive knee 308 and the negative knee 310 can then be computed based on the identified knees. Due to the high magnetization gain of the sensor 104, the minimum external B field can be used for locating the knees when the external B field (which is a combination of the AC file and the DC filed) is parallel to the long axis of the sensor 104. The average value of the AC component is zero so the DC field places the average internal field at the center of the knee. As an example, to allow the use of the minimum external B field, the generators 106, 130 are selected to be four sets of two coil orthogonal dipoles shown in FIG. 2 and FIG. 5. Sometimes less than or more than four sets can be used. Also, each set may include more than two, e.g., three coil orthogonal dipoles. The arrangement can allow for mathematical simplicity in creating a magnetic vector in a space having a known magnitude and direction, as the Cartesian components of the magnetic vector are each controlled by one of the coils. Other arrangements are possible, and by mapping or modeling the B fields, a similar result may be obtained.

After energizing all generators 106, 130, the computer 122 calculates the possible fields generated by the generators 106, 130 based on the DC excitation 118 for each generator 106, 130. As an example, the computer 112 can use elliptical or Legendre integrals for coil type generators 106, 130 to perform the calculations. Information about the generators can be input to the computer 112 in various ways. For example, a computerized mapping robot can automatically send the information to the computer 112, the computer may receive the information as an output from a magnetic field simulation program, or a user may manually input or adjust the information. In some implementations, a pre-acquired map can be used to superimpose fields from multiple generators 106, 130. As an example, the pre-acquired map can be created by placing the arrangement of generators 106, 130 next to a Cartesian robot on which a magnetic sensor is mounted. The robot moves the sensor through defined points in the operating volume and a computer records the magnetic field vector components and sensor location at each point. This information is then stored such that the field values can be used to determine sensor position.

The computer 112 then identifies a magnetic vector that has the same magnitude and direction in all measurements of the different generators 106, 130. The position and orientation that magnetic vector correspond to the location and orientation of the sensor 104 relative to the transmitter 124, 126, which is known to a user and/or the computer 112. The computer 112 then delivers or displays the information about the location and the orientation of the sensor 104 to a user. Sometimes multiple locations may be delivered or displayed, and the possible cause may include metal distortion, exceeding the operating volume of the system, the sensor 104 having a low length-diameter ratio that is not sufficiently directional for the intended use, or the transmitter 6 being under determined, the improvement of which may need adjusting placement the transmitter 6 or more elements of the generators 106, 130.

Second Example Implementation

Each of the features discussed in the first implementation, individually or in combination with the others, can be applied to this second implementation, unless the features are in conflict with any part of the specific descriptions below.

Figure 3:
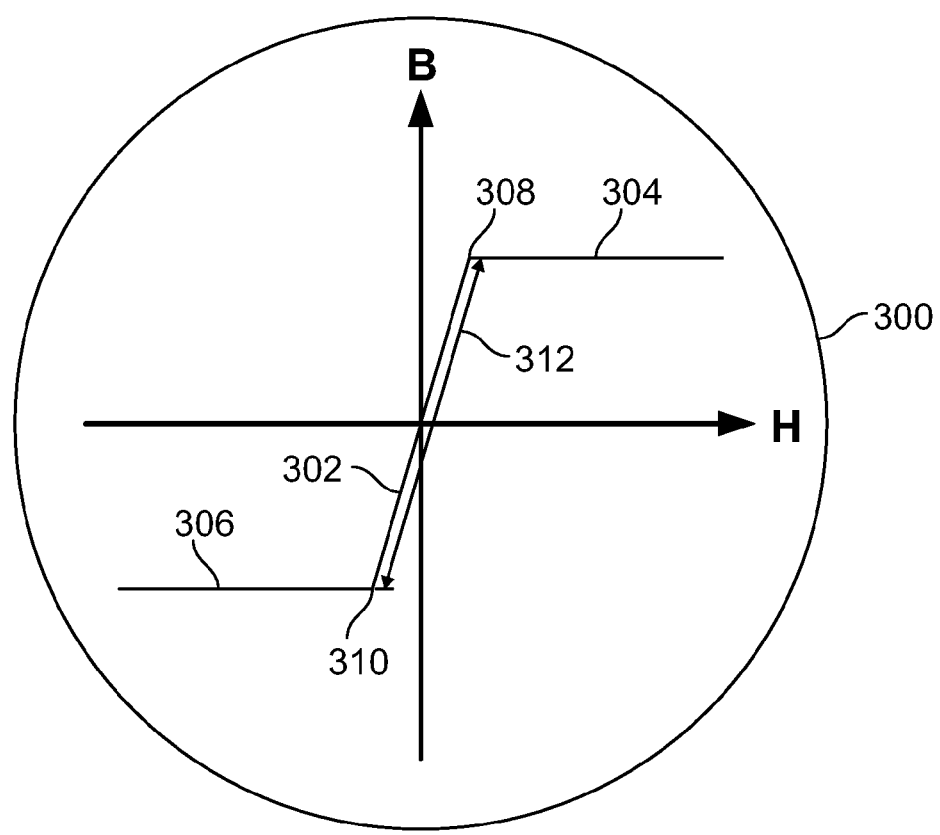
FIG. 3 is a schematic plot of a magnetization curve.

Referring again to FIG. 1, in another example of operation, in response to the AC excitation 120, the generator 106 produces an AC field having a frequency of 12 KHz, which is superimposed on a DC field 116 produced in response to the DC excitation 118. The positive DC excitation 118 is adjusted until the receiver 16 receives even harmonics of the AC excitation 120, and the even harmonics are detected by the detector 108, 110 and delivered to the computer 112. The detector 108, 110 implements an FFT or other suitable means, such as a synchronous demodulator. DC excitation 118 is then adjusted until the signals of the even harmonics received by the receiver 124, 126 are maximized. In addition, the AC excitation 120 is adjusted to further increase the level of the even harmonics signal received by the receiver 124, 126. At this point, the internal B field of the sensor 104, an example of which is shown as the BH curve 300 of FIG. 3, is such that the component contributed by the DC field 116 is approximately or exactly at the positive knee 308.

During a positive half cycle of the AC field, the internal B field of the sensor 104 enters the saturated regions 304 of the BH curve 300, and during the negative half cycle of the AC field, the internal B field of the sensor 104 enters the linear region 302 of the BH curve 300. As explained previously, when the knee 308 is nearly square (as shown in FIG. 3), the magnetization permeability Ur of the sensor 104 in the saturated region 304 is approximately 1, and in the linear region 302 approximately 10,000.

In response to the AC field and the DC field, the sensor 104 produces an asymmetric sensor radiated B field, an example of which is shown in FIG. 4. During the negative half cycle of the AC field and when the internal B field of the sensor 104 is in the linear region 302 of the BH curve 300, a linear region radiated field 402 is produced by the sensor 104 due to the high magnetization gain of the sensor 104. During the positive half cycle of the AC field and when the internal B field of the sensor 104 is in the saturated regions 304, a saturated region radiated field 404 is produced at an amplitude lower than that of the linear region radiated field, as the saturated sensor has a magnetization gain of nearly unity.

The generator 106 is configured to produce a low distortion sine wave such that the fundamental is 80 to 100 dBv above the level of the even harmonics and the even harmonics received by the receiver 124, 126 originate primarily from the sensor 104. In some situations, the level of the even harmonics generated by the sensor 104 is 50 to 70 dBv below the fundamental, and the ratio of the even harmonics generated by the sensor 104 to the parasitic second harmonics is 10 to 50dBv. The asymmetry of the field radiated by the sensor 104 may be reduced when the DC field 116 causes the operating point of the sensor 104 on the BH curve to deviate from the knee 308 substantially. The reduced asymmetry can lead to a reduced second harmonic content in the radiated field. Based on these correlations, the adjustment of the amplitude of DC excitation 118 for maximizing the second harmonics can be performed based on the monitoring of the received second harmonics, e.g., by the computer 112.

Although the negative knee 310 can be similarly determined, such a determination may not be necessary. Either the negative knee 310 or the positive knee 308 can be used to maximize the even harmonic emission from the sensor 104. Sometimes there is no need to locate both knees 308, 310 or calculate the distance 312 between the two knees.

As explained previously, the sensor 104 has an elongated shape, e.g., having a length to diameter ratio of 10:1 or greater, and radiates a magnetic field that is substantially along its long axis.

After optimizing the second harmonic emissions from the sensor 104, the state of the transmitter 124 remains unchanged for the rest of a measurement cycle in which the position and the orientation of the sensor is measured and provided to a user. In some implementations, more than one receiver 124 is used to collect sufficient amount of data/information about the radiated field from the sensor 104 to locate the sensor 104. For example, for the computer 112 to calculate the azimuth, the elevation, the X, Y, Z coordinates, and the effective gain for the sensor 104, the computer 112 needs to use at least six coupling coefficients between the receivers and the sensor 104. Accordingly, at least six receivers, each being the same or similar to the transmitter 124, are needed to collect or provide the six coupling coefficients. Sometimes the system 100 operates more reliably using an over determined solution. As an example, twelve receivers are employed when at least six is needed. The computer 112 then provides information about the computed position and orientation of the sensor to a user, e.g., through a display.

This is similar to a so-called "reverse system" in tracking art, where a small magnetic element, which is normally used as a receiver responsive to signals from larger magnetic elements, is instead used as the transmitter. The larger magnetic elements are then used as receivers. Due to reciprocity in a transformer, the coupling coefficients between elements are the same regardless of forward or reverse operation, thus it is possible to determine position using either method.

Figure 9:
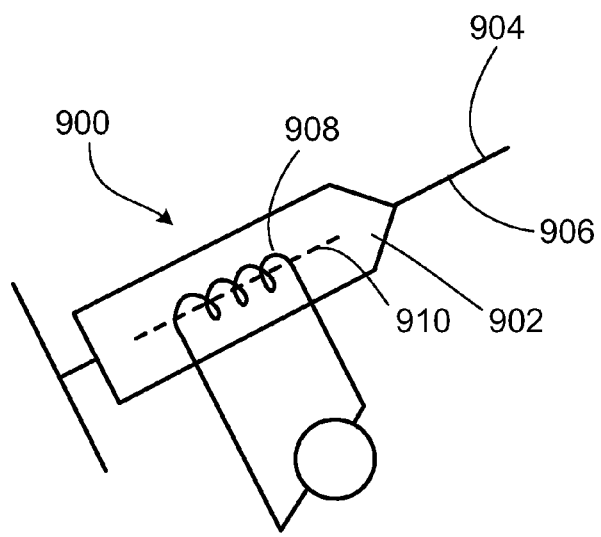
FIG. 9 is a schematic diagram of a syringe incorporating a sensor for tracking the needle of the syringe.

FIG. 9 shows a syringe 900 having a body 902 and a needle 904. To track or measure the location of the needle 904 during the use of the syringe 900, a sensor 906, which can be the same as or similar to the sensor 104 of FIG. 1, is incorporated in the needle 904. A DC bias coil 908 for generating a DC excitation magnetic field is placed on the syringe body 902. The arrangement allows the sensor 906 to remain relatively close to the DC bias coil, e.g., within several centimeters or 3-4 cm, during the use of the syringe 900. Compared to a DC excitation coil located external to the syringe 900, the bias coil 908 can be made smaller due to the reduced distance between the sensor 906 and the coil 908, while still providing sufficient magnetic field strength to locate the B field in sensor 906 at its BH knees, such as the knees 308, 310 of FIG. 3. In addition, the long axis of the coil 908 is constrained by the syringe body 902 to be substantially aligned with the long axis of the sensor 906. Such an arrangement allows the tracking or measurement of the needle location with only the single bias coil 908.

Third Example Implementation

Each of the features discussed in the first implementation and the second implementation, individually or in combination with the others, can be applied to this third implementation, unless the features are in conflict with any part of the specific descriptions below.

Figure 7:
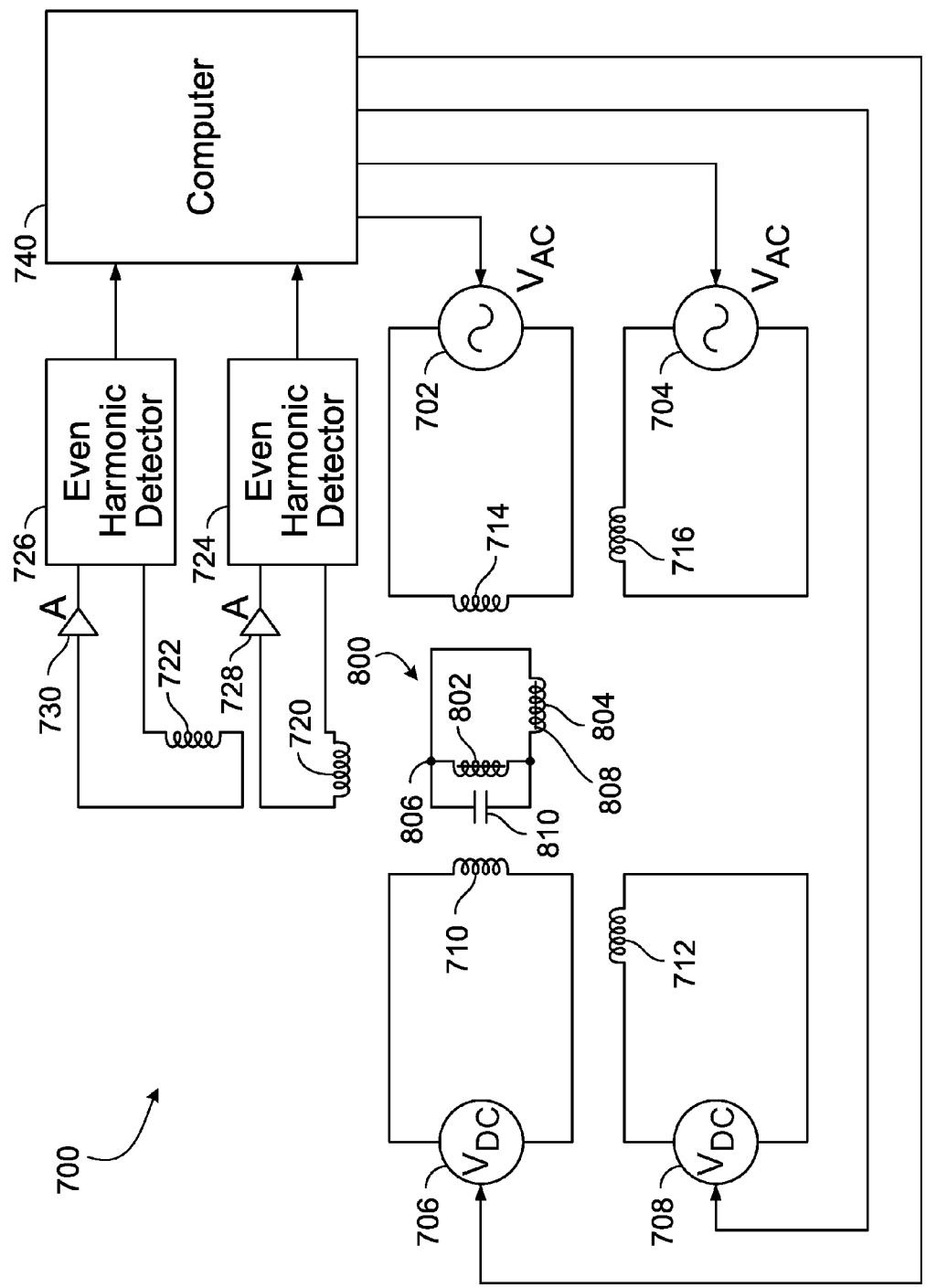
FIG. 7 is a block diagram showing another example of a tracking system.
Figure 8:
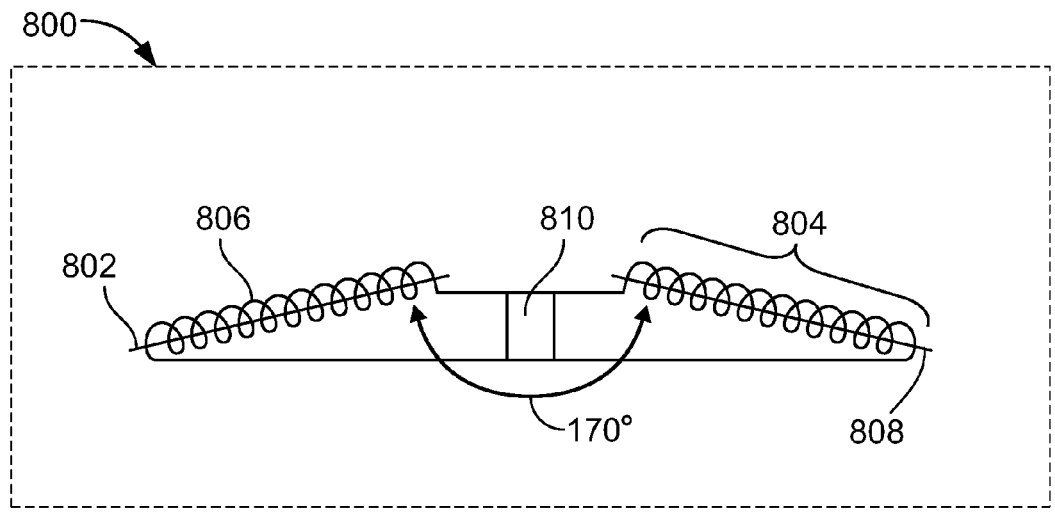
FIG. 8 is a block diagram showing an example of a composite sensor.

Referring to FIGS. 7 and 8, instead of a single, elongated sensor, a composite sensor 800 having two or more sensors can be used in a system 700 for tracking or measuring the position and orientation of an object. In some examples, the entire composite sensor 800 can be incorporated in the object to track the position and orientation of the object in six dimensions. A first sensor 802 in the composite sensor 800 can be the same as or similar to the sensor 104 of FIG. 1. The first sensor 802 has a BH curve with a linear region and two or more non-linear regions that can be identified as knees (see, e.g., FIG. 3). A coil 806 is wound about a long axis of the sensor 802. The composite sensor 800 also includes a second sensor 808 about which another coil 804 is wound. The second sensor 808 is different from the first sensor 802 such that when the excited internal magnetic field in the first sensor 802 moves along the linear part of the BH curve and transitions into the two or more non-linear regions, the internal magnetic field cited by the same source in the second sensor 808 remains in the linear region of its BH curve. The sensor 808 is not necessarily elongated and can be in any shape, such as circular, etc. The material used in the sensor 808 can be different from the material used in the sensor 802. In some implementations, the sensor 808 does not exist and there is only the coil 804.

Examples of suitable materials for the coil 804 can include an air core coil, ferrite, or others. In some implementations, the coil 804 is an air core coil having a diameter of about 3 mm and a length of about 10 mm, and is wound with 600 turns of 48 AWG magnet wire(s). On the other hand, as an example, the coil 806 can have 1,000 turns of 54 AWG wire wound evenly over the length of the sensor 808 (which can be 10-20 mm, e.g., 15 mm in length). The two coils 804, 806 are connected electrically in parallel, and the coil 804 is mechanically oriented antiparallel to the sensor 802 and the coil 806. Optionally, a capacitor 810 can be added in parallel the sensor 802 to increase the signal emitted from the sensor 802 and the two coils 804, 806. The end to end distance between the coils 804, 806 can be about 5 mm, and the long axes of the two coils form a non-zero angle, e.g., 170 degrees. The optional capacitor 810 can be a 0.01 μF surface mounted capacitor. Elements of the composite sensor can also be arranged in other forms. For example, the coil 806 can be wound upon the sensor 802 and located inside the coil 804 (not shown in the figure).

Referring in particular to FIG. 7, the composite sensor 800 can be excited using two DC excitations 706, 708 that generate DC magnetic fields through DC bias coils 710, 712, respectively, and two AC excitations 701, 704 that generate AC magnetic fields through AC bias coils 714, 716. Both coils 806, 804 respond to the AC excitations and emit harmonics. A net emission direction of the harmonics can be detected, which corresponds to the combined responses from the two coils 806, 804, which sometimes can be viewed as a response of an effective, combined coil. However, the coils 806, 804 are not responsive to low frequency excitations, e.g., the DC magnetic fields, the sensor 802 is. Based on the responsiveness, the DC excitations can be adjusted to locate the two knees of the BH curve of the sensor 802 and maximize the harmonic emissions from the composite sensor, during which the sensor 808 remains in the linear region of its BH curve.

To detect and analyze the response signals from the composite sensor 800, in the example shown in FIG. 7, two receivers 720, 722 are placed around the composite 800 to receive data from the magnetic field excited in the composite sensor 800 by the DC and AC magnetic fields. The receivers 710, 722 deliver the data, through amplifiers 728, 730, to detectors 724, 726, respectively. The detectors are the same as or similar to the detector 108 of FIG. 1 and process the received data. At least part of the processed data is further delivered to a computer 740 for use in determining the location and orientation of the composite sensor 800 and the sensor 802. In some implementations, the computer 740 is in communication with the AC excitations 702, 704 and the DC excitations 706, 708 to control, e.g., to adjust, the excitations. In some implementations, the capacitor 810 is tuned such that the composite sensor 800 including the capacitor 810, the sensors 802, 808, and the two coils 804, 806 has a resonant frequency at approximately twice the frequency of the AC excitations 702, 704.

As a result, the position and orientation of the composite sensor 800 are determined in six dimensions using a combination of the features described for the first and second implementations. The DC excitations 706, 708 energize the DC bias coils 710, 712 such that the internal B field of the sensor 802 is positioned at the positive knee of its BH curve, such as the knee 308 of FIG. 3. The AC excitations 702, 704 energize the AC coils 714, 716 such that the composite sensor 800 emits even harmonics of the AC frequency of the AC excitations 702, 704. As an example, the frequency of the AC excitations is 16 KHz. The even harmonics generated by the composite sensor 800 is detected by the receivers 720, 722 and a desired gain is applied to the harmonics by the amplifiers 728, 730. The detectors 724, 726 process the received information about the even harmonics and deliver the processed information to the computer 740. An example of the information is computed amplitude of the even harmonics.

Based on the received information about the even harmonics, the computer 740 determines whether the DC excitations 706, 708 need to be adjusted for the composite sensor 800 to produce maximum even harmonics. The computer 740 may also provide information about how the adjustment should be made, e.g., how much increase or how much decrease in the DC current, and sometimes automatically make the adjustment. The computer 740 may be in communication with the DC excitation and may automatically adjust the DC excitation without interference from a user. In other situations, a user may adjust the DC excitations 706, 708 based on the information provided by the computer 740.

Once the even harmonics are maximized, the even harmonics, or second harmonics, of the composite sensor 800 is maintained, while the DC current for the excitations 706, 708 are adjusted to locate the knee(s) on the BH curve of the sensor 802. In particular, the minimum combined excitation current from multiple DC bias coils is sought. At the minimum combined excitation current, the total positive DC bias field is aligned with the long axis of sensor 802 and the internal B field excited by the DC bias field is at the positive knee of its BH curve.

The computer 19 then directs the DC excitations 706, 708 to energize the DC bias coils to locate the negative knee of its BH curve. For example, the polarity of DC excitations 706, 708 is reversed and the same procedure used for locating the positive knee is implemented. At the minimum combined excitation current, the total negative DC bias field is aligned with the long axis of sensor 802.

The computer 740 computes the difference between the positive and negative currents from DC excitations 706, 708 for each of DC bias coils 710, 712 used in a particular excitation cycle. This difference represents the net excitation current required to move the magnetic field within the sensor 802 by an amount equal to the distance between the positive and negative knees on the BH curve. A magnetic field map can be developed based on the knowledge about the magnetic field characteristics of each coil 710, 712 in the excitation cycle. In the magnetic field map, at least one of the magnetic field vectors is directionally aligned with the long axis of sensor 802 and has a magnitude proportionally to the distance between the positive and negative knees.

This excitation process, including locating the positive and the negative knees, and producing the field map, is repeated using one or more different sets of DC excitation coils 710, 712. Since the BH curve of sensor 802 is a feature of the sensor 802 and does not change with the different excitation processes, one or more field maps including one or more sets of field vectors can be produced. From the different field maps, the computer 740 can search for a common vector value. The position and orientation of the corresponding vector represents the X, Y, Z position, the azimuth angle, and the elevation angle of the sensor 804 relative to the coils 710, 712, 714, 716. Accordingly, the position and the orientation of the sensor 802 are determined in five degrees.

To determine the last degree, the roll angle, of the sensor 802, the position and orientation of the composite sensor 800 are measured. Due to the spatially displaced positions of the sensor 802 and the coils 804, 806, the total second harmonic magnetic emission from the composite sensor 800 may not align with or center on the long axis of sensor 802. Based on the even harmonics signals received from the composite sensor 800, the computer 740 calculates the azimuth angle, the elevation angle, the X, Y, Z position relative to the bias coils and the effective gain for the composite sensor 800. Such calculations need at least six known coupling coefficients between the receivers 720, 722 and the sensor 802. Accordingly, although two receives are shown, at least six receivers are deployed. Sometimes, to provide reliability, twelve receivers are deployed.

As a result, the spatial position, the azimuth angle, and the elevation angle of the sensor 802 relative to the bias coils is determined based on a DC field component of the internal magnetic field of the sensor 802, and the spatial position, the azimuth angle, and the elevation angle of the even harmonic AC magnetic portion of the composite sensor 800 are independently determined using multiple receivers that is responsive to an even harmonic AC field component from the composite sensor 800. Therefore, the tracking system is able to obtain two separate sets of data on five degrees of freedom. By displacing the spatial position of the sensor 802 relative to the second harmonic AC magnetic center and the long axis of the composite sensor 800, the $6^{th}$ degree of freedom, i.e., the roll angle, of the sensor 802 can be determined.

Any two more of the foregoing implementations or examples may be used in an appropriate combination in an appropriate system for measuring the position and location of an object. Likewise, individual features of any two more of the foregoing implementations may be used in an appropriate combination. The subsections and their respective titles are used to facilitate reading and understanding of the description. The titles of the subsections do not cover or limit the interpretation of the content of the respective subsections. The content of the subsections are not separate or independent from each other. Instead, any appropriate combinations of features from different subsections can be made.

Elements of different implementations described herein may be combined to form other implementations not specifically set forth above. Elements may be left out of the processes, systems, apparatus, etc., described herein without adversely affecting their operation. Various separate elements may be combined into one or more individual elements to perform the functions described herein.

Although certain embodiments of the methods and systems are described, variations can be included into these embodiments, or other embodiments can also be used. For example, the sensors for tracking/measuring the location and orientation of an object do not necessarily have a BH curve as shown or similar to that is shown in FIG. 3. The BH curve of the sensors may not have well-defined or sharp knees. In this situation, instead of the positive and/or negative knees, a point on the BH curve where the even harmonic signals are at a peak value can be used. During the tracking or measuring, the knees of the BH curve do not have to be exactly located. Instead, a position on the BH curve that can be reached in a repeatable manner can be used to replace any of the knees.

Other embodiments are within the scope of the following claims.

What is claimed is:

1. A system comprising:
    a sensor having a length to diameter aspect ratio of 10:1 or higher and comprising a ferromagnetic material, the ferromagnetic material having a non-linear magnetization response, and the response containing a maximum point of non-linearity;
    a DC magnetic field source that is adjustable for providing a magnetic excitation field to excite a magnetic field within the sensor, the provided magnetic excitation field having a range such that the excited magnetic field within the sensor is near the maximum point of non-linearity,
    an AC magnetic field source being configured to generate an AC magnetic field having a fundamental frequency, wherein the AC magnetic field causes the sensor to generate even harmonics that include even multiples of the fundamental frequency, and
    a receiver being configured to receive the even harmonics from the sensor for determining a position of the sensor.

2. The system of claim 1, wherein the sensor comprises an elongated rod formed of the ferromagnetic material.

3. The system of claim 1, wherein the sensor comprises a foil.

4. The system of claim 1, wherein the sensor comprises a tube.

5. The system of claim 4, wherein the tube comprises all or part of a hypodermic needle.

6. The system of claim 1, wherein the sensor is incorporated in a needle of a syringe and the DC magnetic field source is incorporated in a body of the syringe.

7. The system of claim 6, wherein the DC magnetic field source comprises a single bias coil.

8. The system of claim 7, wherein the bias coil has a long axis substantially aligned with a long axis of the sensor.

9. The system of claim 6, wherein a distance between the sensor and the DC magnetic field source remains substantially the same during use of the syringe, and the distance is in an order of centimeters.

10. The system of claim 1, comprising a processor for determining the position of the sensor based on the even harmonics.

11. The system of claim 1, wherein the DC magnetic field source is configured to maximize the even harmonics from the sensor.

12. The system of claim 1, wherein the DC magnetic field source and the AC magnetic field source are co-located.

13. The system of claim 1, wherein the DC magnetic field source and the AC magnetic field source comprise a common transmitter coil.

14. The system of claim 1, wherein the DC magnetic field source and AC magnetic field source are separated.

15. The system of claim 1, comprising multiple DC magnetic field sources.

16. The system of claim 1, comprising multiple receivers configured to receive the even harmonics.

17. The system of claim 16, wherein the DC magnetic field source is configured to be adjustable to maximize the even harmonics from the sensor.

18. The system of claim 16, wherein the multiple receivers are arranged at different locations relative to the sensor and receive the even harmonics having different amplitudes, and the even harmonics having different amplitudes being used for determining the location of the sensor.

19. The system of claim 1, wherein the received even harmonics are to be processed for determining an orientation of the sensor.

20. The system of claim 19, wherein the received even harmonics are to be processed for determining the position and the orientation of the sensor in at least five degrees of freedom.

21. The system of claim 20, wherein the received even harmonics are to be processed for determining the position and the orientation of the sensor in six degrees of freedom.

22. The system of claim 1, wherein the DC magnetic field source is arranged such that the DC magnetic field is aligned with a long axis of the sensor.

23. A method comprising:
    applying a DC magnetic field to a sensor comprising a ferromagnetic material to excite a magnetic field within the sensor, the sensor having a length to diameter aspect ratio of 10:1 or higher, the ferromagnetic material having a non-linear magnetization response to a magnetization excitation, and the response containing a maximum point of non-linearity,
    adjusting the DC magnetic field so that the excited magnetic field within the sensor is near the maximum point of non-linearity,
    applying an AC magnetic field having a fundamental frequency, wherein the AC magnetic field causes the sensor to generate even harmonics that include even multiples of the fundamental frequency, and analyzing the even harmonics to determine a position of the sensor.

24. The method of claim 23, wherein adjusting the DC magnetic field comprises aligning the DC magnetic field with a long axis of the sensor.

25. The method of claim 23, wherein the response contains a minimum point of non-linearity and method comprises adjusting the DC magnetic field so that the excited magnetic field within the sensor is near the minimum point of non-linearity.

26. The method of claim 25, comprising determining a distance between the maximum point and the minimum point of non-linearity.

27. The method of claim 23, wherein analyzing the even harmonics comprises calculating an amplitude of the even harmonics.

28. The method of claim 27, comprising receiving the even harmonics using multiple receivers at different locations relative to the sensor, and the amplitudes of the even harmonics received by different receivers are different.

29. The method of claim 23, wherein adjusting the DC magnetic field comprises maximizing the even harmonics from the sensor and minimizing a total DC excitation while maintaining the maximized even harmonics.

30. The method of claim 29, comprising receiving AC signals from the sensor using multiple receivers and wherein analyzing the even harmonics to determine a position of the sensor comprises determining a position of an AC magnetic center of the receivers.

31. A system comprising:
an elongated sensor comprising a ferromagnetic material, the sensor having a length to diameter aspect ratio of 10:1 or higher, the ferromagnetic material having a non-linear magnetization response that contains a maximum point of non-linearity,
a plurality of DC magnetic field sources configured to adjust a magnetic field within the sensor near the maximum point of non-linearity,
an AC magnetic transmitter operable to generate an AC magnetic field in the vicinity of the sensor and having a fundamental frequency, wherein the AC magnetic field causes the sensor to generate even harmonics in response to the AC magnetic field, the even harmonics including even multiples of the fundamental frequency, and
a plurality of receivers capable of detecting at least some of the even harmonics from the sensor, the detected even harmonics being usable for determining a position of the sensor.

32. The system of claim 31, comprising a computer for determining the position of the sensor.

33. A system comprising:
a composite sensor comprising
a first elongated sensor comprising a first ferromagnetic material, the first elongated sensor having a length to diameter aspect ratio of 10:1 or higher, the first ferromagnetic material having a first non-linear magnetization response that contains a first maximum point of non-linearity, a second non-linear magnetization response that contains a second maximum point of non-linearity, and a substantially linear magnetization response between the first and second maximum points of non-linearity,
a first coil wound about a long axis of the first elongated sensor, and
a second coil electrically connected to the first coil;
a plurality of DC magnetic field sources configured to adjust a magnetic field within the first elongated sensor near the first maximum point of non-linearity and the second maximum point of non-linearity;
a plurality of AC magnetic transmitters operable to generate AC magnetic fields each having a fundamental frequency, wherein the AC magnetic fields cause the first and second coils to generate even harmonics in response to the AC magnetic fields, the even harmonics including even multiples of the fundamental frequency; and
a plurality of receivers capable of detecting at least some of the even harmonics from the first and second coils, the detected even harmonics being usable for determining a position of the first elongated sensor in five degrees of freedom and a position of the composite sensor in five degrees of freedom.

34. The system of claim 33, wherein the first and second coils are electrically connected in parallel.

* * * * *